United States Patent [19]

Walters et al.

[11] Patent Number: 4,811,607
[45] Date of Patent: Mar. 14, 1989

[54] FLOW SENSOR

[75] Inventors: Ronald B. Walters, Wembley; Peter M. Hamey, Emsworth, both of England

[73] Assignee: Vickers Systems Limited, Havant, England

[21] Appl. No.: 40,244

[22] Filed: Apr. 20, 1987

[30] Foreign Application Priority Data

Apr. 21, 1986 [GB] United Kingdom ............... 8609658
Jun. 3, 1986 [GB] United Kingdom ............... 8613394

[51] Int. Cl.⁴ ........................ G01F 1/22; G01F 1/26
[52] U.S. Cl. ........................ 73/861.53; 73/861.58
[58] Field of Search ........... 73/861.53, 861.54, 861.52, 73/861.55, 861.58, 861.56

[56] References Cited

U.S. PATENT DOCUMENTS

| | | | |
|---|---|---|---|
| 2,574,866 | 10/1951 | Fahrlander | 73/861.58 |
| 3,528,288 | 9/1970 | Scourtes | 73/861.53 |
| 3,763,746 | 10/1973 | Walters | 91/433 |
| 4,235,105 | 11/1980 | Walters | 71/861.53 |
| 4,254,664 | 3/1981 | Graham | 73/861.58 |
| 4,315,436 | 2/1982 | McCabe et al. | 73/861.54 |
| 4,366,718 | 1/1983 | Nelson | 73/861.58 |
| 4,459,860 | 7/1984 | Walters | 73/861.55 |
| 4,552,027 | 11/1985 | Larner | 73/861.53 |

Primary Examiner—Stewart J. Levy
Assistant Examiner—Robert P. Bell
Attorney, Agent, or Firm—Barnes, Kisselle, Raisch, Choate, Whittemore & Hulbert

[57] ABSTRACT

A flow sensor comprises a body (4) formed with a through bore (5), at least one fluid inlet (6, 7) and one fluid outlet (7,6) for permitting ingress and egress of fluid to and from the sensor, and a spool (8) slidably mounted within the bore and having at least one shaped end (38) past which fluid flows from the inlet to the outlet, characterized in that the spool (8) also has resilient means (26) mounted internally thereof and acting against and between two spaced abutments (27, 28) which are connected to the interior of the spool in such a way that they move with the spool in one direction of movement thereof and slide relative to the spool in the opposite direction of movement thereof, the spool being arranged to close the outlet in the null position of the spool when no fluid takes place, and being movable against the action of the resilient means when fluid flow is present, to open the outlet, the extent of movement being representative of the rate of flow of the fluid and being sensed by sensor means (37) associated with the spool to provide an output also representative of fluid flow.

12 Claims, 15 Drawing Sheets

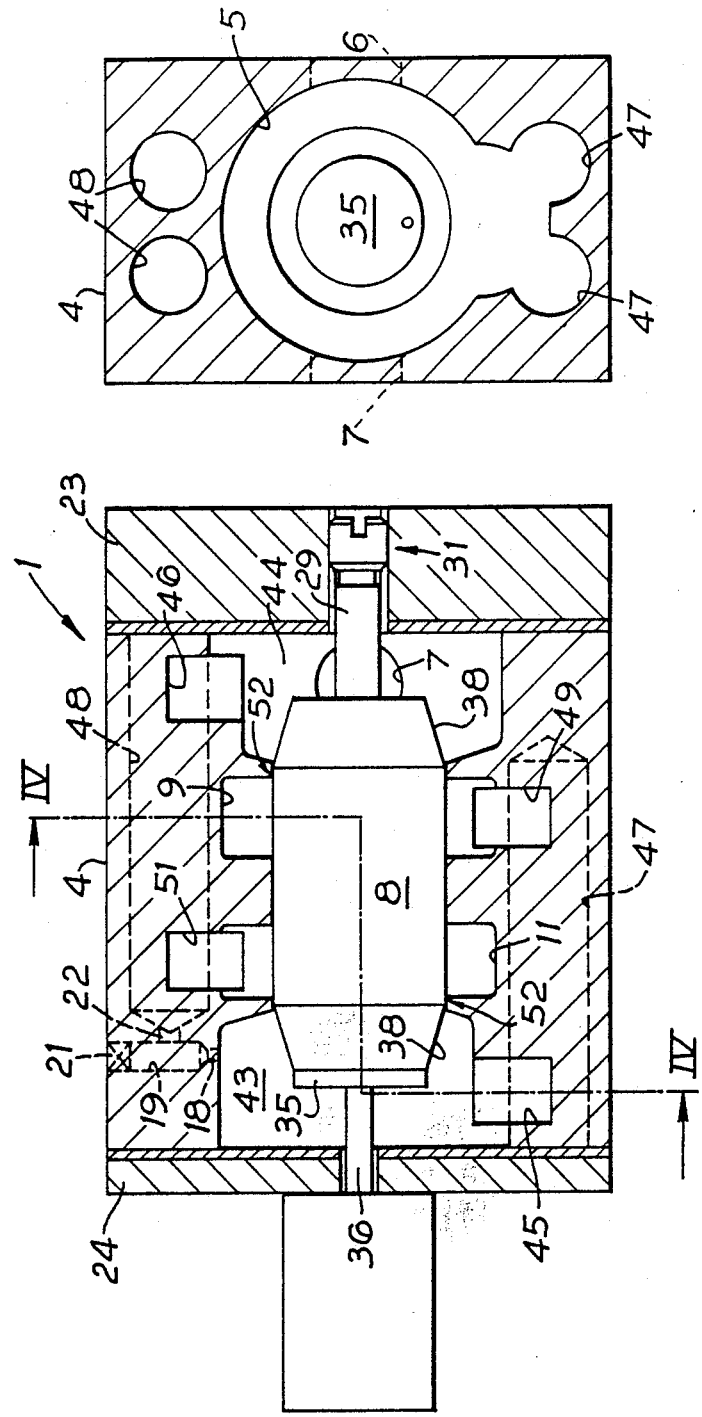

FLOW SENSOR

BACKGROUND OF THE INVENTION

1. Field of Invention

This invention relates to fluid flow sensors and has particular, but not exclusive, reference to flow sensors for use in hydraulic controls.

2. Description of the Prior Art

In British patent specification No. 1335041 there is disclosed an hydraulic actuator control embodying a flow sensor which is used to provide hydraulic feedback. In some instances the flow sensor comprises a spool or bobbin which is movable within a profiled throat to effect the required flow sensing and in one embodiment, the bobbin is shaped at each end and is acted upon at each end by a spring, with the throat being a regular cylinder, i.e. not profiled. The use of a profiled throat has been found to be relatively expensive in that the machining operation required is not entirely straightforward. Furthermore, if the characteristics of the flow sensor have to be changed, it is necessary to provide a throat with a different profile and hence change the whole body of the sensor. Nevertheless, this has been the preferred procedure rather than use the shaped bobbin because the latter is relatively long and flow sensors often need to be mounted where space is at a premium. Also, the use of hydraulic feedback from the flow sensor in this prior arrangement does not permit any adjustment of the gain of the system which can be effected using electrical feedback.

SUMMARY OF THE INVENTION

According to the present invention there is provided a flow sensor comprising a body formed with a through bore, at least one fluid inlet and one fluid outlet for permitting ingress and egress of fluid to and from the sensor, and a spool slidably mounted within the bore and having at least one shaped end past which fluid flows from the inlet to the outlet, the spool also having resilient means mounted internally thereof and acting against and between two spaced abutments which are connected to the interior of the spool in such a way that they move with the spool in one direction, of movement thereof and slide relative to the spool in the opposite direction of movement thereof, the spool being arranged to close the outlet in the null position of the spool when no fluid flow takes place, and being movable against the action of the resilient means when fluid flow is present, to open the outlet, the extent of movement being representative of the rate of flow of the fluid and being sensed by sensor means associated with the spool to provide an output also representative of fluid flow.

The flow sensor may be unidirectional or bidirectional and in the latter event, both ends of the spool are profiled with the resilient means serving to urge the spool to the null position irrespective of the previous direction of movement thereof. Preferably, the resilient means are in the form of a helical compression spring mounted between the two abutments which may be mounted on a rod adjustably mounted at one end within the body of the flow sensor and extending within the spool, the abutments being mounted on the rod such that their distance apart is held at a maximum but is decreased on movement of the spool.

The means for sensing the movement of the spool may be a linear variable differential transformer (LVDT), a pressure transducer or a potentiometer, for example, so as to provide an electrical output signal representative of fluid flow and which can be used as a feedback signal in control apparatus in which the flow sensor is fitted.

A small, fixed orifice may be employed to provide a permanent bleed or by-pass connection between the sensor inlet and outlet. The advantage of this is that a relatively high pressure drop is developed across the fixed orifice even at very low flow rates which thus effects spool displacement which in turn produces an output representative of flow. Thus a feedback signal is produced even at low flow rates which is a distinct advantage. Clearly, the size of the fixed orifice can be changed to vary the performance characteristics of the sensor and in this respect it has been found particularly advantageous to employ a variable orifice.

Furthermore, the fixed or variable orifice can be employed in conjunction with an overlapped sensor spool although zero lap can be used if desired.

A flow sensor in accordance with the invention has many applications for example as a feedback element in meter-in/meter-out systems or in bleed-off systems which may be employed in lift or elevator control systems.

BRIEF DESCRIPTION OF THE DRAWINGS

A bidirectional flow sensor in accordance with the present invention will now be described in greater detail, by way of example, with reference to the accompanying in which:

FIG. 3 is a cross-sectional view of another embodiment of the invention, FIG. 4 is a section on the line IV—IV of FIG. 3, FIGS. 5 to 10 are graphs (some composite) helpful in discussing the performance of the flow sensors of FIGS. 1 and 3;

DESCRIPTION OF THE EMBODIMENTS

Figure 2:
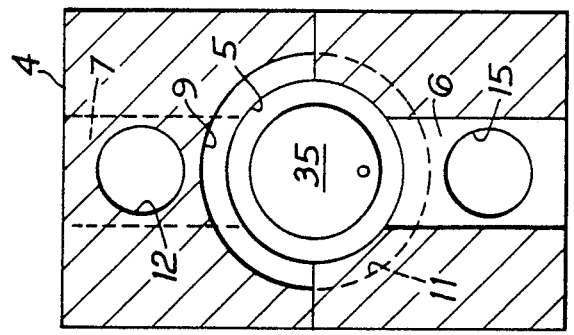
FIG. 2 is in section on the line II—II of FIG. 1.
Figure 1:
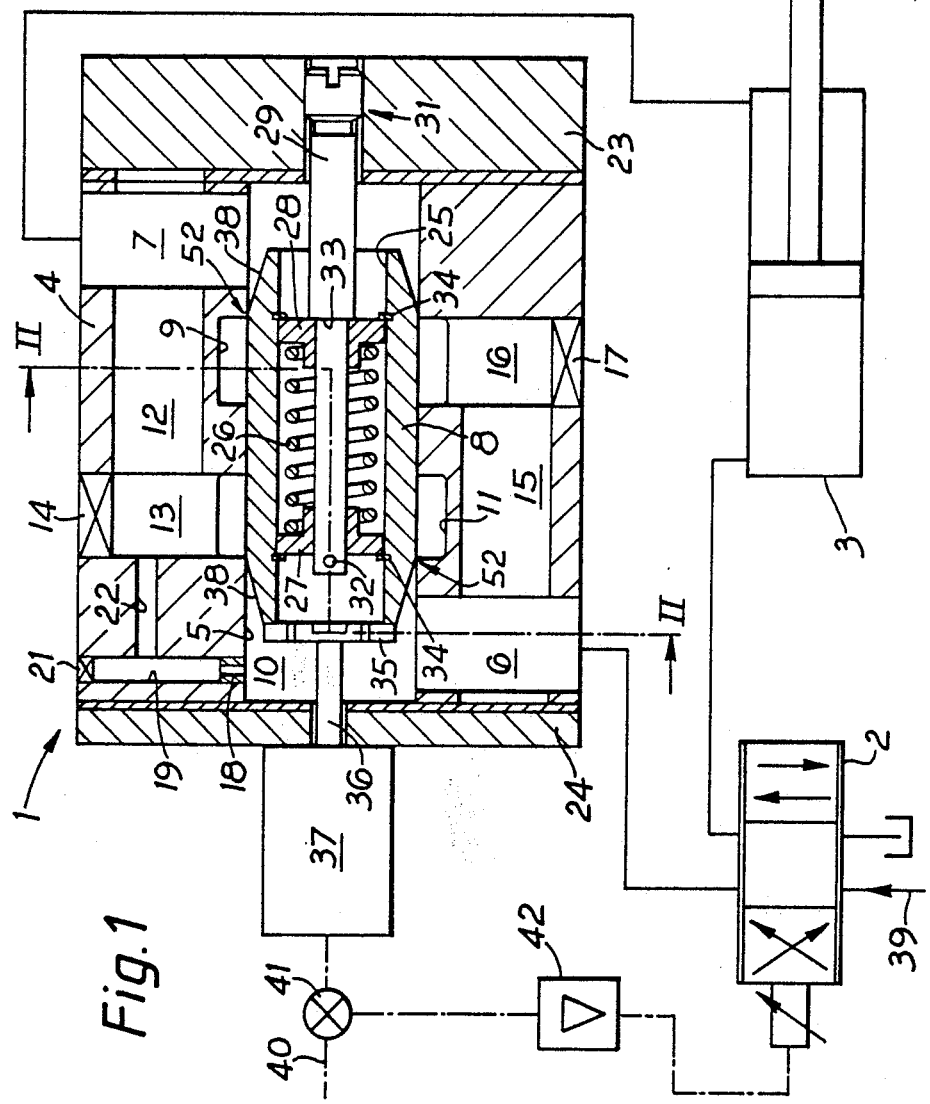
FIG. 1 is an hydraulic circuit embodying one embodiment of flow sensor which is shown in cross-section.

Referring first to FIGS. 1 and 2, the flow sensor is indicated generally at 1 and is enlarged for clarity of detail relative to a solenoid-operated, four-way control valve 2 and a double-acting hydraulic actuator 3 with which it is associated. The flow sensor 1 comprises a body 4 of rectangular cross-section and having a central through-bore 5 and two apertures 6 and 7 drilled from opposed sides of the body 4 and offset relative to the axis of the bore 5, these apertures extending from the outside of the body to the bore 5 to provide either a fluid inlet or fluid outlet, depending on the direction of fluid flow, bearing in mind the sensor is bidirectional. A spool or bobbin 8 is slidably mounted in the bore 5 and is shown in the null position in FIG. 1 which it adopts when there is no fluid flow through the device. In the null position of the spool 8, the main body of the latter closes two annular ports 9 and 11 provided in the bore 5, the first of which ports can connect with the inlet/outlet 6 via a drilling 15 extending parallel to the control aperture and extending from the inlet/outlet to another aperture 16 which connects with the port 9 and is plugged at 17 on the exterior of the sensor body 4, the second annular port 11 being connectible to the inlet/outlet 7 via drillings 12 and 13 similar to drillings 15 and 16, respectively, the drilling 13 being plugged at 14. A fixed by-pass or bleed orifice 18 is provided at the end of a further drilling 19 which is plugged at 21 and interconnects with a drilling 22 which in turn interconnects with the drilling 13 and hence the inlet/outlet 7. The bleed orifice 18 is provided at the end of the bore 5 with which the inlet/outlet 6 connects, whereby the two inlets/outlets 6, 7 are permanently connected therethrough. The body 4 of the flow sensor 1 has two end caps 23 and 24 which close the respective ends of the bore 5 in a sealed manner.

The spool 8 is in the form of a hollow cylinder having a through bore 25 in which is mounted resilient means in the form of a compression centering spring 26 which acts against and between two spaced apart abutments 27 and 28 slidably mounted on a rod 29 which extends axially within the spool and is adjustably mounted by adjustment means 31 at one end in the end cap 23. The abutments 27 and 28 are set at a maximum distance apart by a pin 32 passing through the rod 29 and a shoulder 33 on the rod, respectively. The abutments 27 and 28 are connected to the spool 8 by respective circlips 34. The left-hand end of the spool 8, as seen in FIG. 1, is closed by a disc 35 which is connected to an actuating rod 36 of an LVDT 37 mounted on the end cap 24. Each end of the spool 8 is tapered at 38.

Looking now at the overall hydraulic control arrangement of FIG. 1, pressure fluid is admitted to the control valve 2 on a line 39 and is directed by the latter either to the inlet 6 thence through the flow sensor 1 via the outlet 7 to the annular end of the actuator 3 or to the full end of the actuator 3, whereby fluid flows from the annular end to the inlet 7 of the flow sensor 1, through the sensor to the outlet 6, and thence to tank via the valve 2, depending on the setting of the control valve 2. With the spool 8 of the flow sensor 1 in the null position of FIG. 1 and with the control valve 2 set to direct pressure fluid to the new inlet 6, the flow sensor operates as follows.

When pressure fluid enters an end chamber 10 of the flow sensor formed by the bore 5 through the inlet/outlet 6, the spool 8 is moved to the right, as seen in FIG. 1, as soon as the differential pressure developed across the spool 8 is sufficient to overcome the preload of the spring 26. As the spool 8 moves to the right the abutment 27 moves with it but the abutment 28 is held stationary by the shoulder 34 on the rod 29, relative sliding movement thus taking place between the abutment 28 and the bore 25 of the spool. As the spool 8 moves in this way, the port 11 is gradually opened by virtue of the taper 38 on the left-hand of the spool, the greater the fluid flow, the greater the movement of the spool and hence the greater the opening of the port 11. The port 9 remains closed but fluid passes to the now open outlet 7 via the drillings 13 and 12 hence to one end of the actuator 3 to move the same. If the flow rate decreases, the spool will be moved to the left by the action of the spring 26, the spool being returned to the null position when flow ceases.

Movement of the spool 8 is transmitted to the actuating rod 36 of the LVDT 37, whereby an electrical output signal is produced by the latter which signal is representative of the spool movement and hence of fluid flow. This output signal is used as a feedback signal and is taken to a algebraic summing junction 41 to which a demand signal is also applied on a line 40, the difference between these two signals providing an error signal which is applied to the controlling solenoid of the control valve 2 via a drive amplifier 42 to control the flow to the actuator 3 accordingly, as is conventional.

Turning now to FIGS. 3 and 4, these show an alternative embodiment of flow sensor 1 in which like components have similar reference numerals. This embodiment is basically similar to that of FIG. 1, the difference being in the provision of the interconnection between the ports 9 and 11 and the inlets/outlets 6 and 7. In this embodiment the inlets/outlets 6 and 7 are side drillings (as opposed to top and bottom drillings in FIG. 1) and they connect with respective end chambers 43 and 44 provided at the ends of control aperture 5. The inlet/outlet 6 is seen in FIG. 4 but not in FIG. 3. These end chambers 43 and 44 connect via respective cut-away portions 45 and 46 of the sensor body 4 with respective pairs of blind bores 47 and 48 provided in the flow sensor body 4 and extending parallel to the control aperture 5. The one pair of blind bores 47 connects with the port 9 and the other pair 48 with the port 11 via further cut-away portions 49 and 51 of the sensor body 4.

The internal arrangement of the spool 8 is identical to that of FIG. 1 as is the operation of the flow sensor 1. However, the embodiment of FIG. 3 is preferred to that of FIG. 1 for the following reasons:

(i) The side inlets/outlets 6,7 allow the sensor to be used in sandwich construction, for example between a valve and a mounting face.

(ii) The cross-sectional area of the flow path between the inlet and outlet is increased whilst keeping the overall external dimensions of the sensor, whereby the pressure loss is reduced and hence system efficiency increased without having to increase the size of the sensor.

(iii) The sensor body is easier and cheaper to produce because the drillings are more straightforward and the plugs 14 and 17 of FIG. 1 are dispensed with.

In the meter-in/meter-out systems of FIGS. 1 and 3, the power source may be a fixed or pressure-compensated variable displacement pump and the systems are capable of controlling both opposing and assisting loads.

It should be noted that FIGS. 1 and 3 show a spool 8 with virtually zero lap with respect to the metering edges 52 but normally an overlapped spool will be employed which assists the low flow performance characteristics in conjunction with the fixed orifice 18 as will be appreciated from FIGS. 5 to 10.

Turning now to FIGS. 5 to 10, these are various graphs illustrating the operational characteristics of the embodiments of FIGS. 1 and 3. Looking first at FIG. 5, this is a graph of flow (Q) in liters per minute against the travel y of the spool 8 in millimetres along the bottom, and pressure drop ($\Delta P$) in Bars along the top. The curves were achieved with a spool lap of $-2$ mm (i.e. an overlap) on each side (i.e. $-4$ mm overall) with respect to the metering edges 52 associated with the ends of the spool 8. Curve 53 was obtained with the embodiment of FIG. 1 and curve 54 with the embodiment of FIG. 3, plotting flow (Q) against pressure drop (ΔP). Curve 55 was obtained plotting flow against movement or travel y of the spool 8. It should be noted that the angle α of the taper 38 at each end of the spool 8 was 16.7°. It will be seen, for example, that at a flow of 300 liters per minute, the spool travel y is approximately 8.9 mm for curve 55 (for both FIG. 1 and FIG. 3 embodiments), with a pressure drop of 16.5 Bar for curve 53 (FIG. 1 embodiment) and 13.4 Bar for curve 54 (FIG. 3 embodiment). Thus the FIG. 3 embodiment exhibits a lower pressure drop for a given flow rate and thus is more efficient than the FIG. 1 embodiment due to the flow path of a larger cross-sectional area as already discussed.

Figure 5:
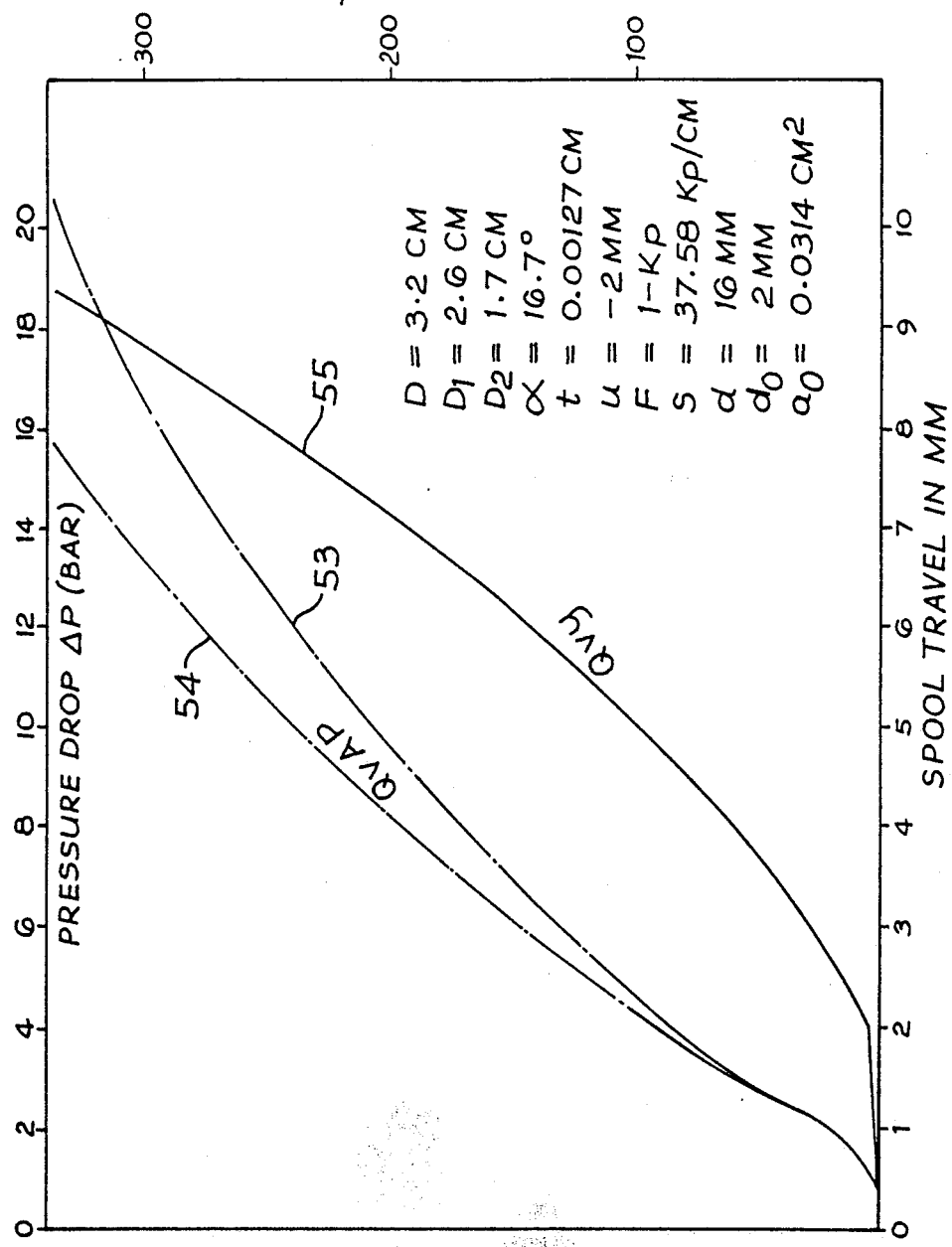
Figure 6:
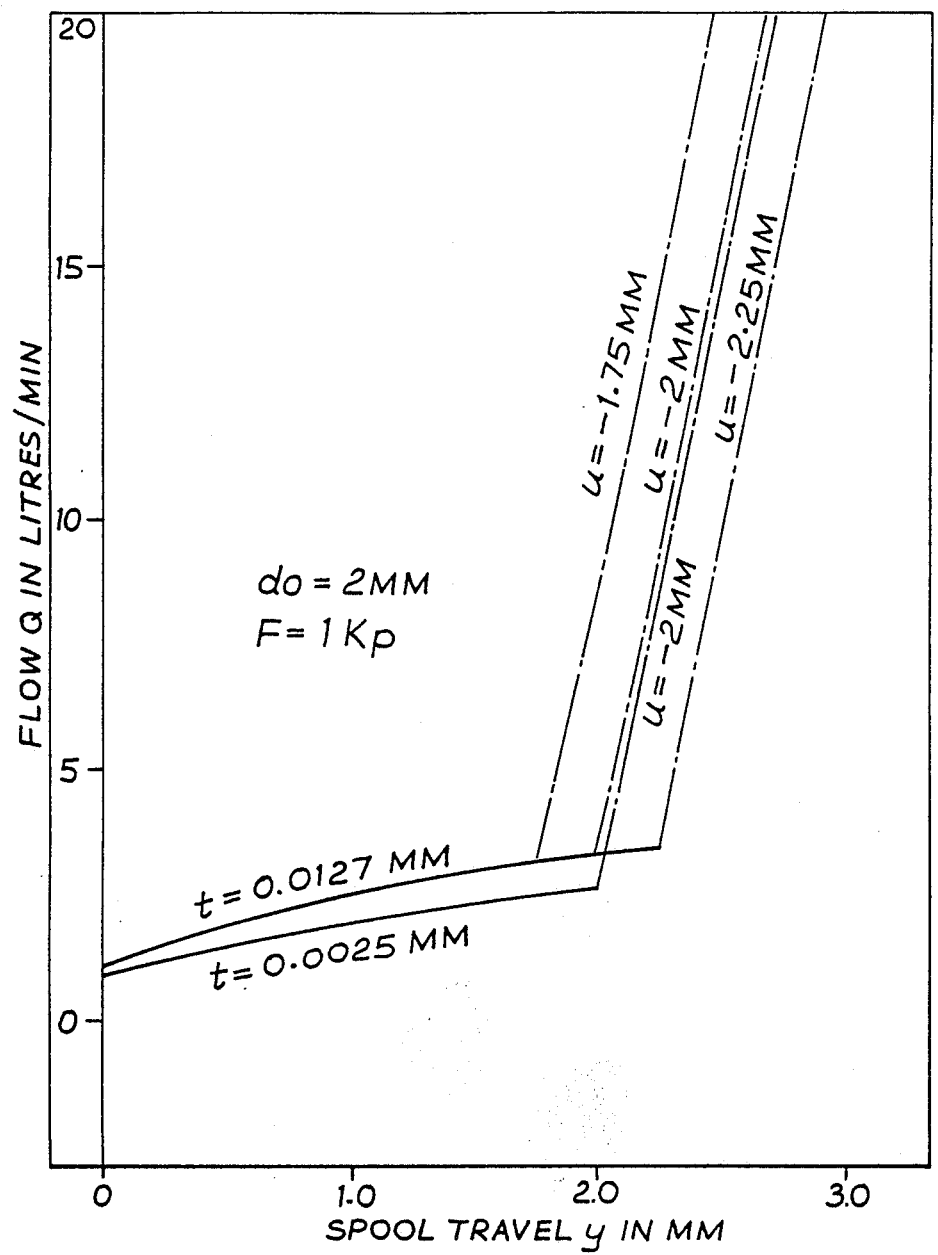
Figure 7:
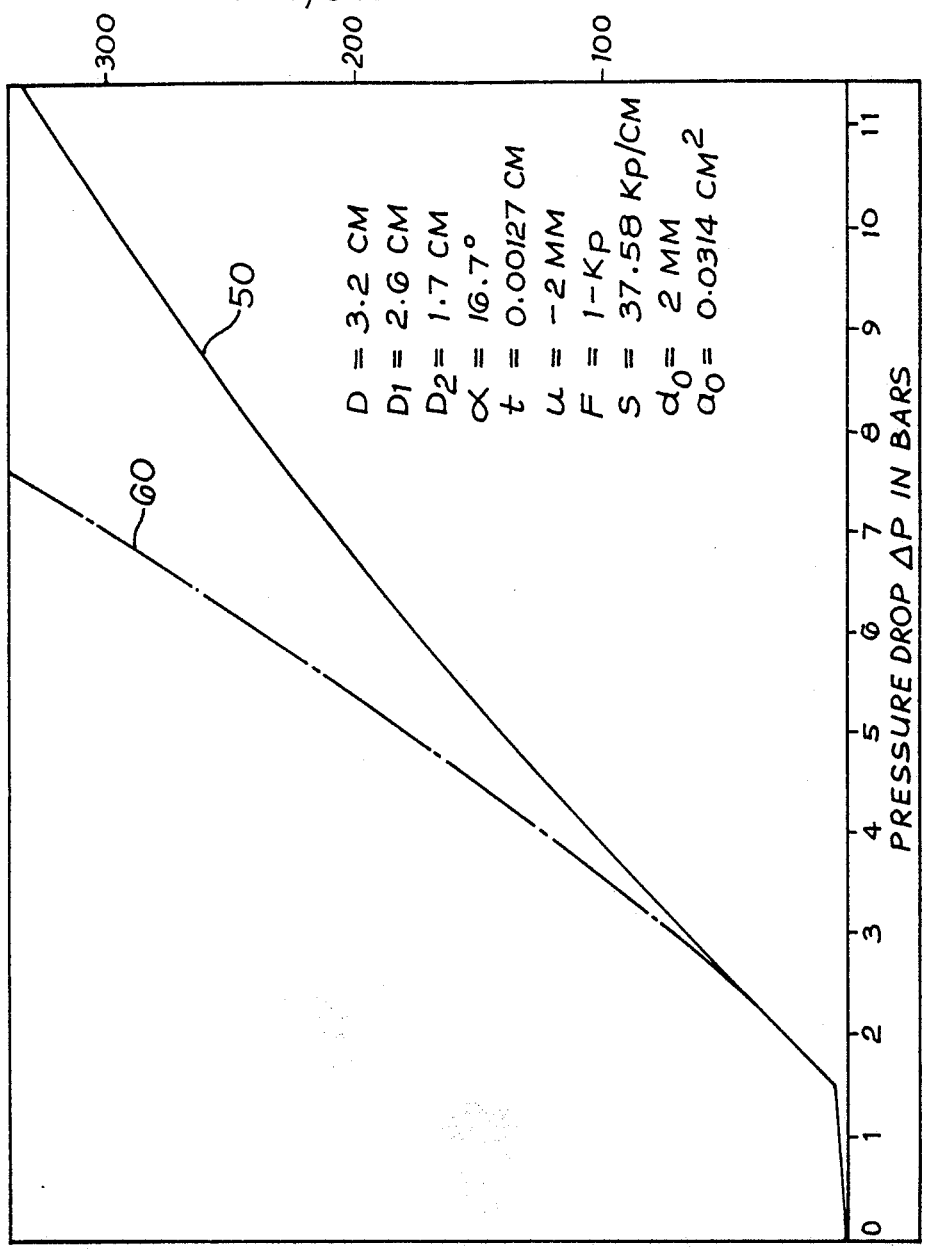
Figure 8:
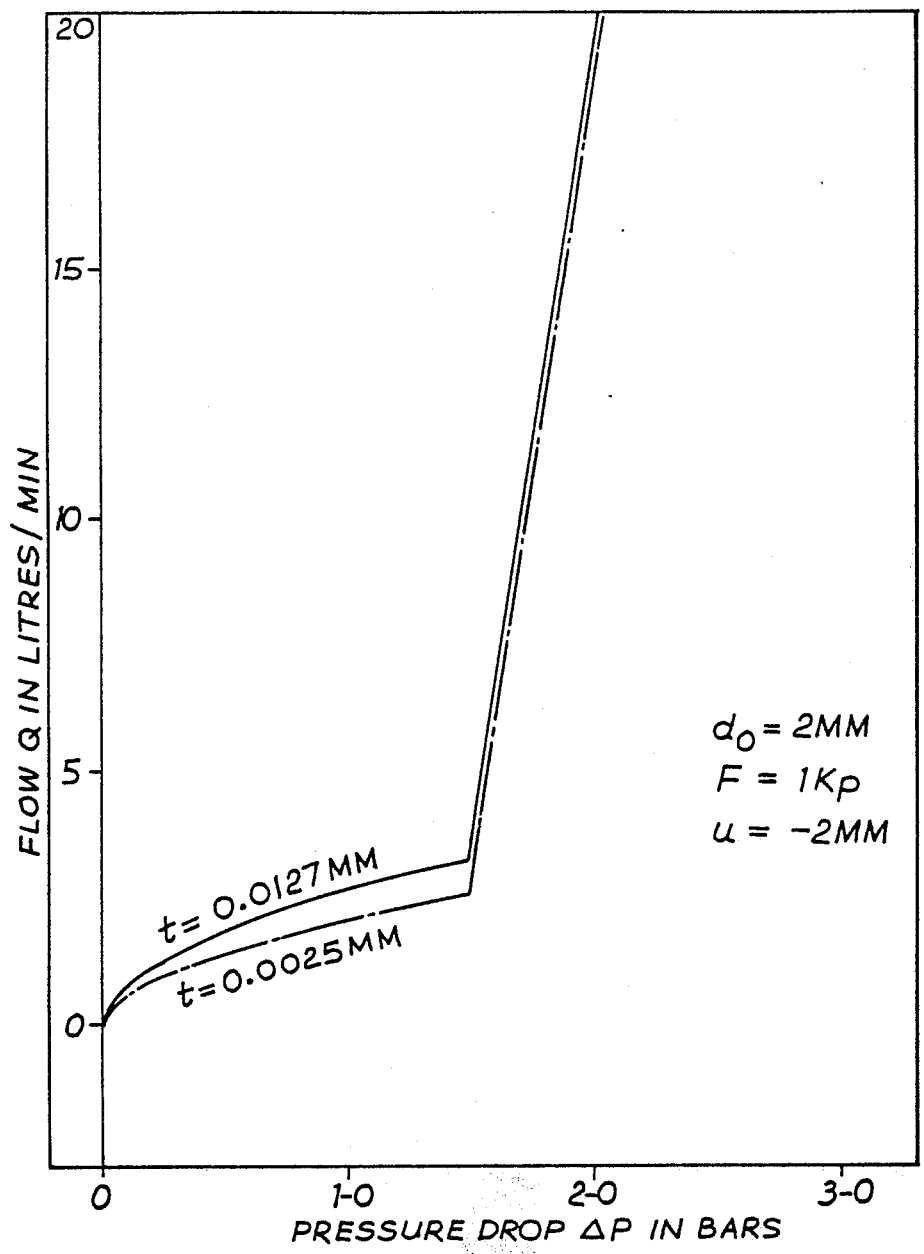

FIG. 6 is an enlargement of the first portion of the curve 55 of FIG. 5 but showing the effect of manufacturing tolerances as regards radial clearance t between the spool 8 and the bore 5, and as regards the lap condition u. Three lap conditions are shown for one radial clearance of t=0.0127 mm and one lap condition for t=0.0025 mm. FIG. 7 shows curves basically corresponding generally to curve 55 of FIG. 8 but using a pressure transducer instead of the LVDT 37, with curve 50 resulting from the FIG. 1 embodiment and curve 60 resulting from the FIG. 3 embodiment. FIG. 8 shows an enlargement of the first portion of the curves 50,60 of FIG. 10, with two different radial clearances t between the spool 8 and the bore 5.

Figure 9:
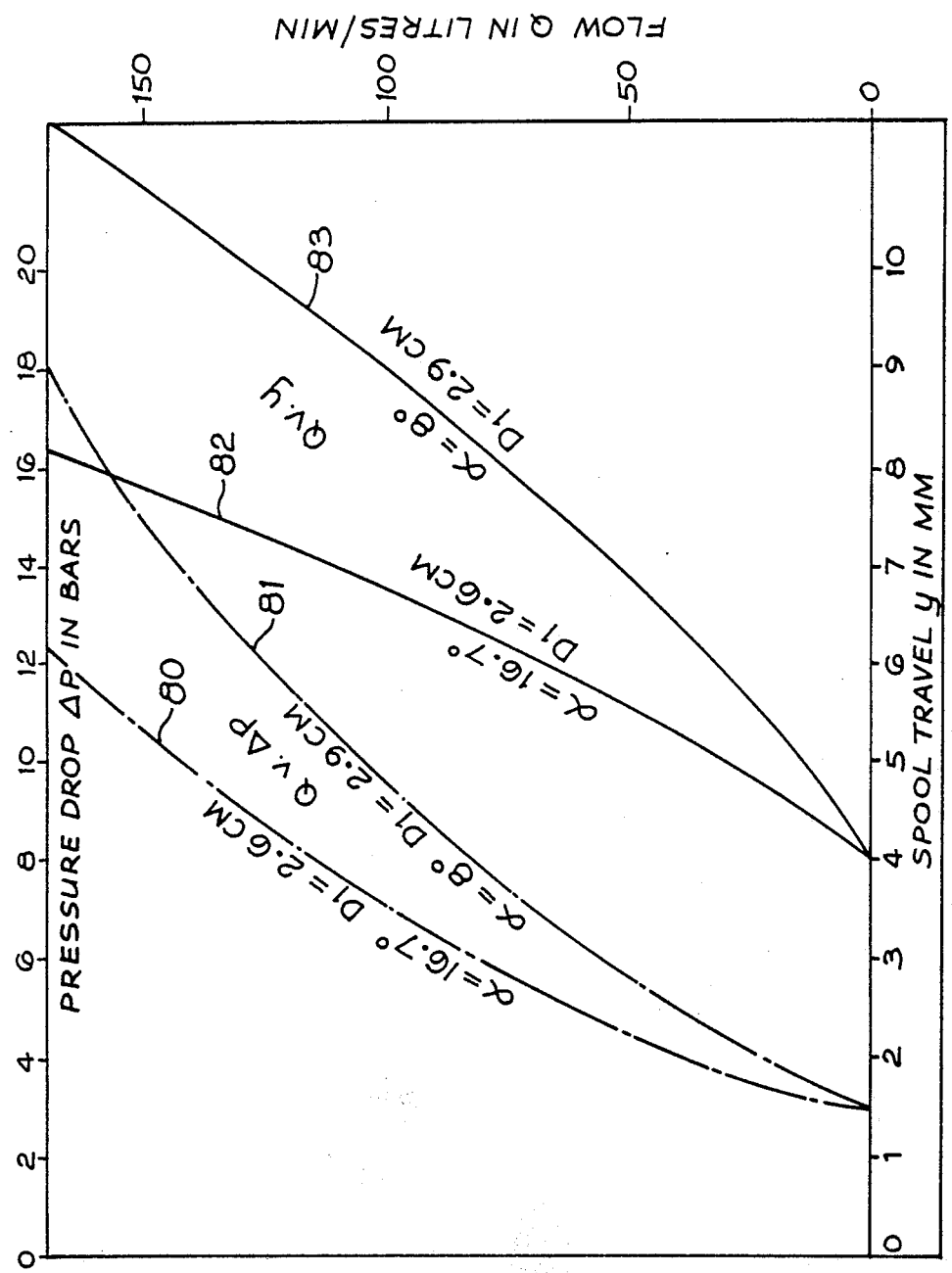

FIG. 9 shows four curves resulting from the embodiment of FIG. 3, with curves 80 and 81 being pressure drop ΔP against flow Q for two different spool end tapers 38 of α=16.7° and 8°, respectively, and spool end diameters of $D_1$=2.6 cm and 2.9 cm, respectively. Curves 82 and 83 show flow Q against spool travel y for the same α and $D_1$ values as curves 80 and 81, respectively. It will be seen from curves 82 and 83 that for a flow Q of 150 liters per minute, there is a spool travel of 10.65 mm for α=8° and $D_1$=2.9 cm, and a travel 7.8 mm for α=16.7° and $D_1$=2.6 cm. Thus, the greater the taper 38 on the ends of the spool 8, the less the sensitivity of the sensor. However, looking at curves 80 and 81, again for a flow Q of 150 liters per minute, we have a pressure drop of 14.8 Bar for α=8° and $D_1$=2.9 cm, and 10.6 Bar for α=16.7° and $D_1$=2.6 cm. Thus the greater the spool taper 38, the more efficient the sensor due to the lower pressure drop. Accordingly, there is a trade off between sensitivity and efficiency. It is noted that for curves 82 and 83 the overlap u has been increased from 2 mm to 4 mm.

Figure 10:
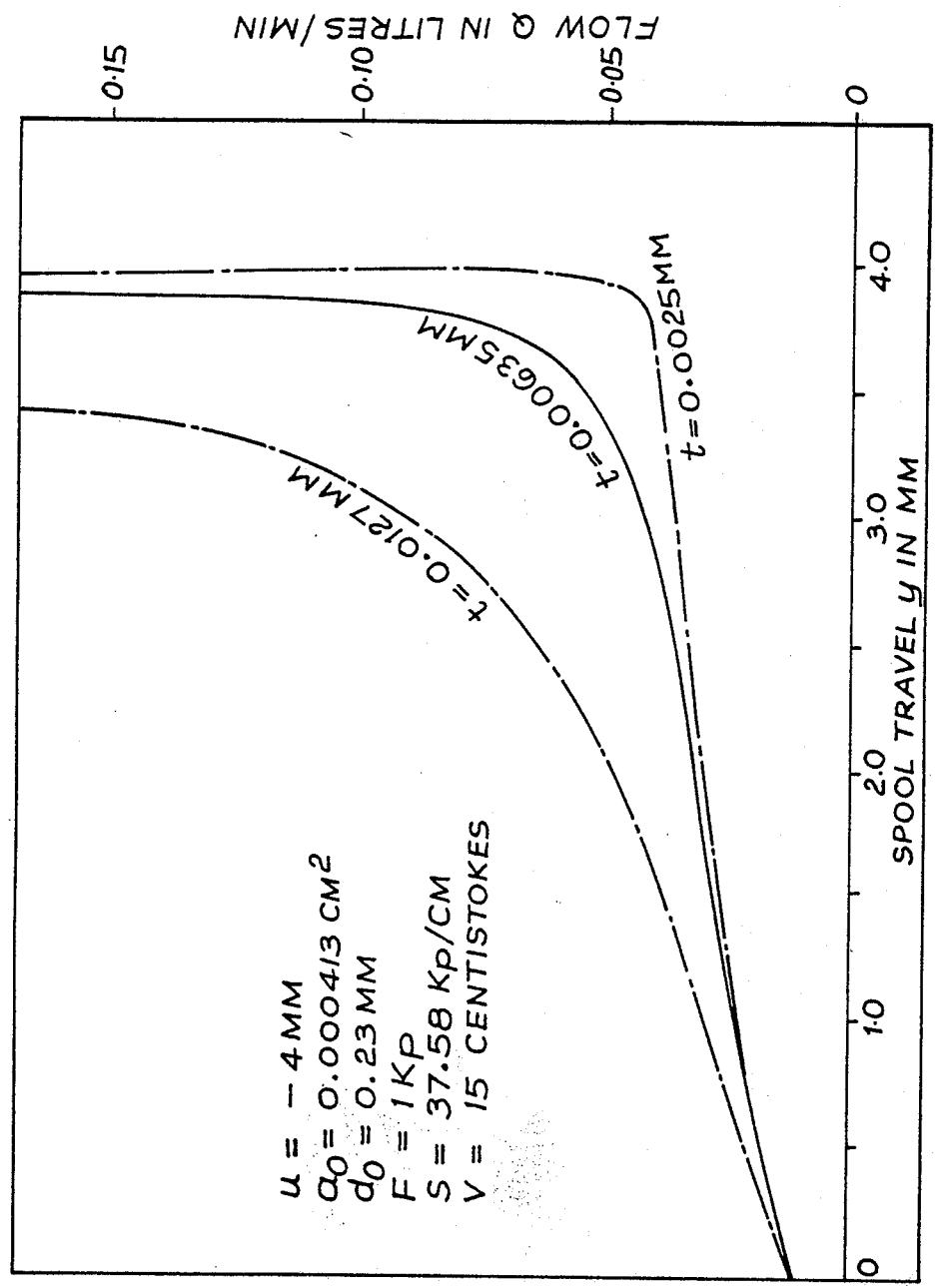

FIG. 10 shows an enlargement applicable to both the curves 82 and 83 of FIG. 9 and showing the results of three different radial clearances t between the spool 8 and the bore 5 using a smaller fixed orifice $a_o$ diameter $d_o$ of 0.23 mm and a fluid of viscosity V=15 centistokes. Thus in order to reduce the effect of radial clearance t on the sensor sensitivity, it is preferable to keep it as small as possible but in practical terms no greater than t=0.00635 mm.

The graphs of FIGS. 5 to 10 carry certain parameters of the sensors of which the performance characteristics are illustrated. The parameters in question are defined as follows:

D=diameter of bore 5 in the sensor body 4.
$D_1$=diameter of outer (tapered) end of the spool 8
$D_2$=bore diameter 25 of spool 8
α=angle of taper 38 of the ends of the spool 8
t=radial clearance between the spool 8 and the bore 5.
u=lap condition of the spool 8 relative to the metering edges 52 with an overlap represented as a negative lap
F=preload of the spring 26
S=spring rate of the spring 26
d=diameter of drillings 12 and 15
$d_o$ =diameter of the fixed orifice 18
$a_o$ =cross-sectional area of the fixed orifice 18.
V=viscosity of the hydraulic fluid.

In the embodiments of FIGS. 1 and 3, the disc 35 is apertured, whereby the differential pressure acting on the spool to move it against the action of the spring 26 is provided by the difference in cross-sectional area of the bores 5 and 25. Whilst the abutments 27 and 28 and associated circlips 34 serve to prevent any major flow of fluid through the centre of the spool, some leakage therethrough could occur and at low flow rates and this would adversely affect the flow characteristics of the valve. Accordingly, in the embodiment of FIG. 11 this disadvantage is overcome by making the disc 35 as part of the spool 8, or sealed with respect thereto, and providing apertures 90 in the abutments 27 and 28. In this way, the effective differential pressure area is the full cross-sectional area of the bore 5, i.e. the cross-sectional area of the spool 8. This is because of the port 6 is the inlet, then pressure fluid will act on the entire left-hand end of the spool 8, and if the port 7 is the inlet, pressure fluid will act on the annular right-hand end of the spool 8 and on the full inside face of the disc to which the fluid has access through the abutment apertures 90. Apart from the changes to the disc 35 and abutments 27, 28, the embodiment of FIG. 14 is similar to that of FIG. 1.

Figure 11:
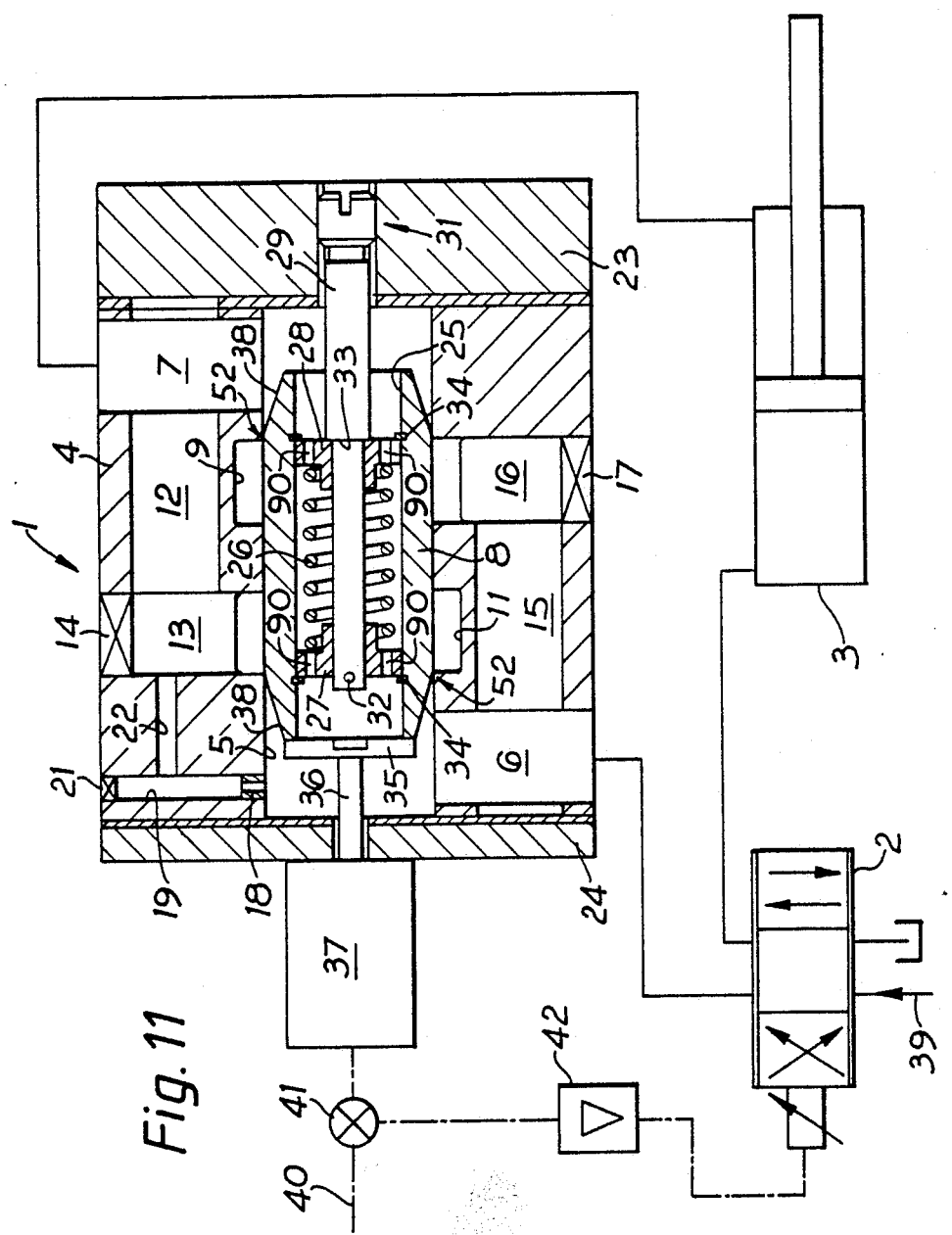
FIG. 11 a cross-sectional view of a further embodiment.
Figure 12:
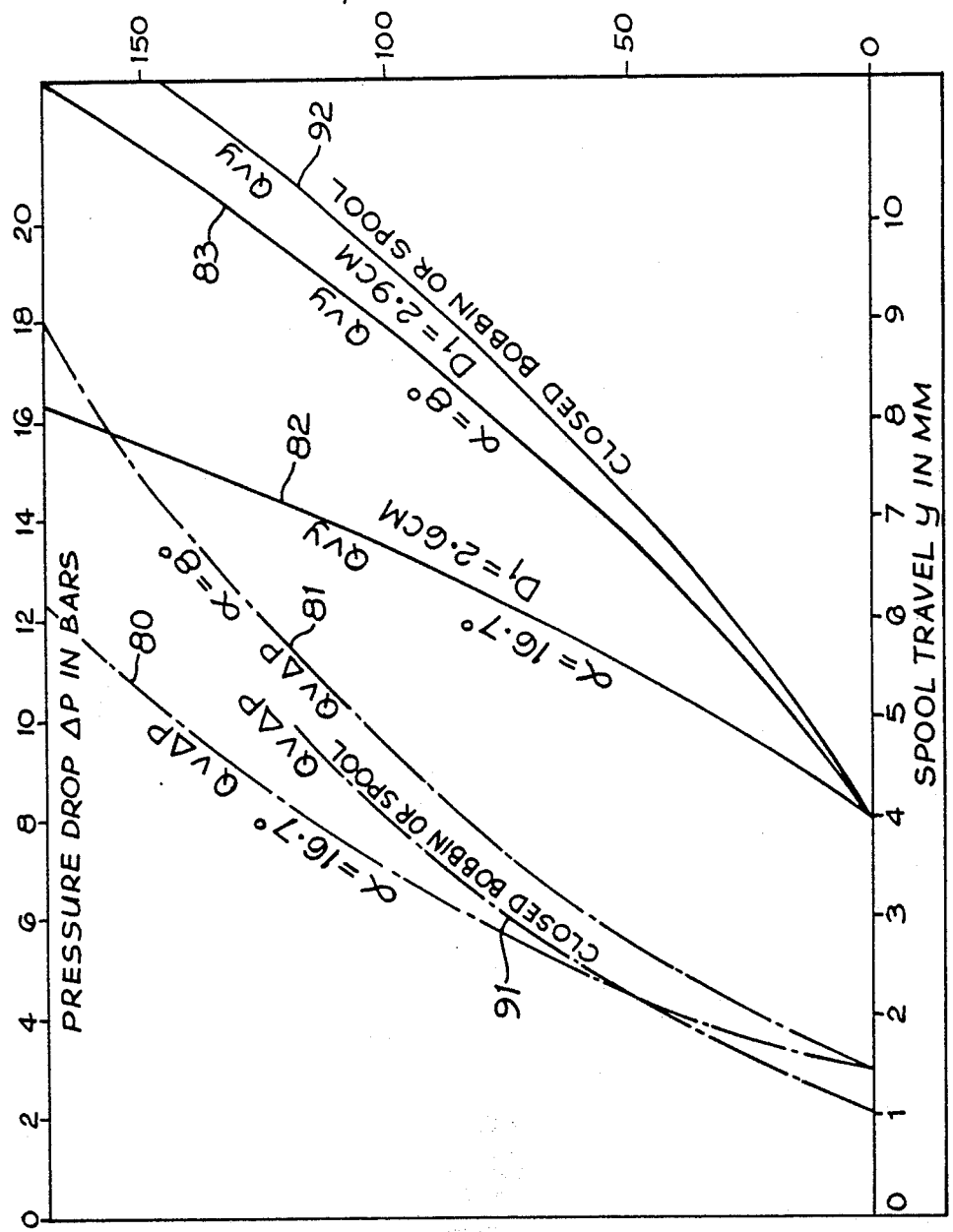
FIG. 12 and 13 are graphs similar to FIGS. 9 and 10, respectively.

Turning now to FIG. 12, this shows the same curves as FIG. 9 and, in addition two extra curves 91 and 92 resulting from the closed spool arrangement of FIG. 11. It will be seen on comparing curves 81 and 91 (as curves 91 was obtained with α=8°) that for a given flow rate, a lower pressure drop ΔP is achieved using a closed spool, and on comparing curves 83 and 92 (as curve 92 was obtained with α=8°, $D_1$=2.9 cms) that for a given flow rate a larger displacement of the spool 8 is achieved using a closed spool.

Figure 13:
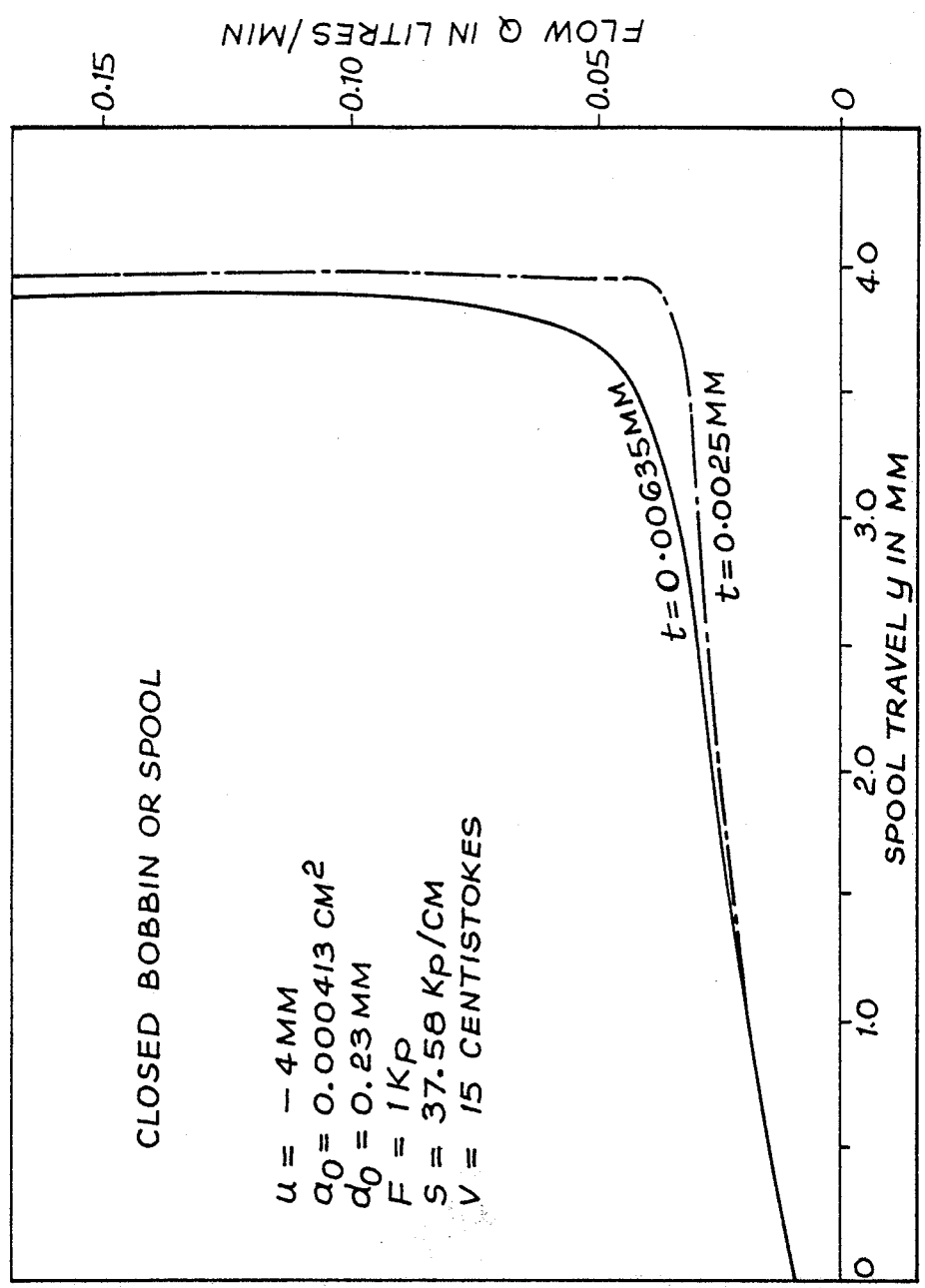

In FIG. 13, the two curves shown were obtained with a closed spool 8 but using the same valves of t as the curves of FIG. 10. It will be seen that for given flow rate, a larger displacement of the spool 8 is achieved using the closed spool configuration of FIG. 11.

Figure 14:
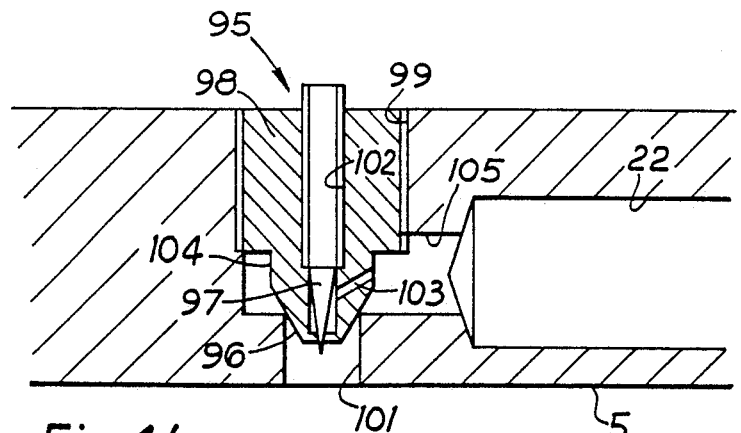
FIG. 14 is an enlarged scrap view of a preferred arrangement which may be incorporated into the flow sensors of FIGS. 1, 3 and 11.

In the embodiments of FIGS. 1, 3 and 11, a fixed by-pass or bleed orifice 18 is employed but it has been found particularly advantageous to replace the fixed orifice by a variable or adjustable orifice such as is shown at 95 in FIG. 14. The adjustable orifice 95 is in fact a double orifice device in that a coned valve member 96 is provided to give a relatively coarse adjustment (for example using a 60° cone), and a needle valve 97 to give a relatively fine adjustment (for example using a 16° cone). The valve member 96 is provided at the end of a body 98 which is screw threaded and is received in a threaded bore 99 which is equivalent to the bore or drilling 19 of the embodiments of FIGS. 1, 3 and 11. A counterbore 101 is provided in the bore 99 to provide a smaller orifice (typically of 8 mm diameter) with which the valve member 96 is co-operable to control the flow of fluid from the main bore 5 of the flow sensor to the drilling 22, and vice versa. The needle valve 97 is provided concentrically within the main or coarse valve 96 and is threadedly received thereby in a threaded central bore 102 which communicates with the bore 101 through the needle valve. A drilling or bore 103 is provided in the body 98 connecting the bore 102 to the periphery of the reduced end 104 of the body 98 and thus communicating with a bore 105 (typically of 8 mm diameter) which constitutes a counterbore of the bore or drilling 22.

Figure 15:
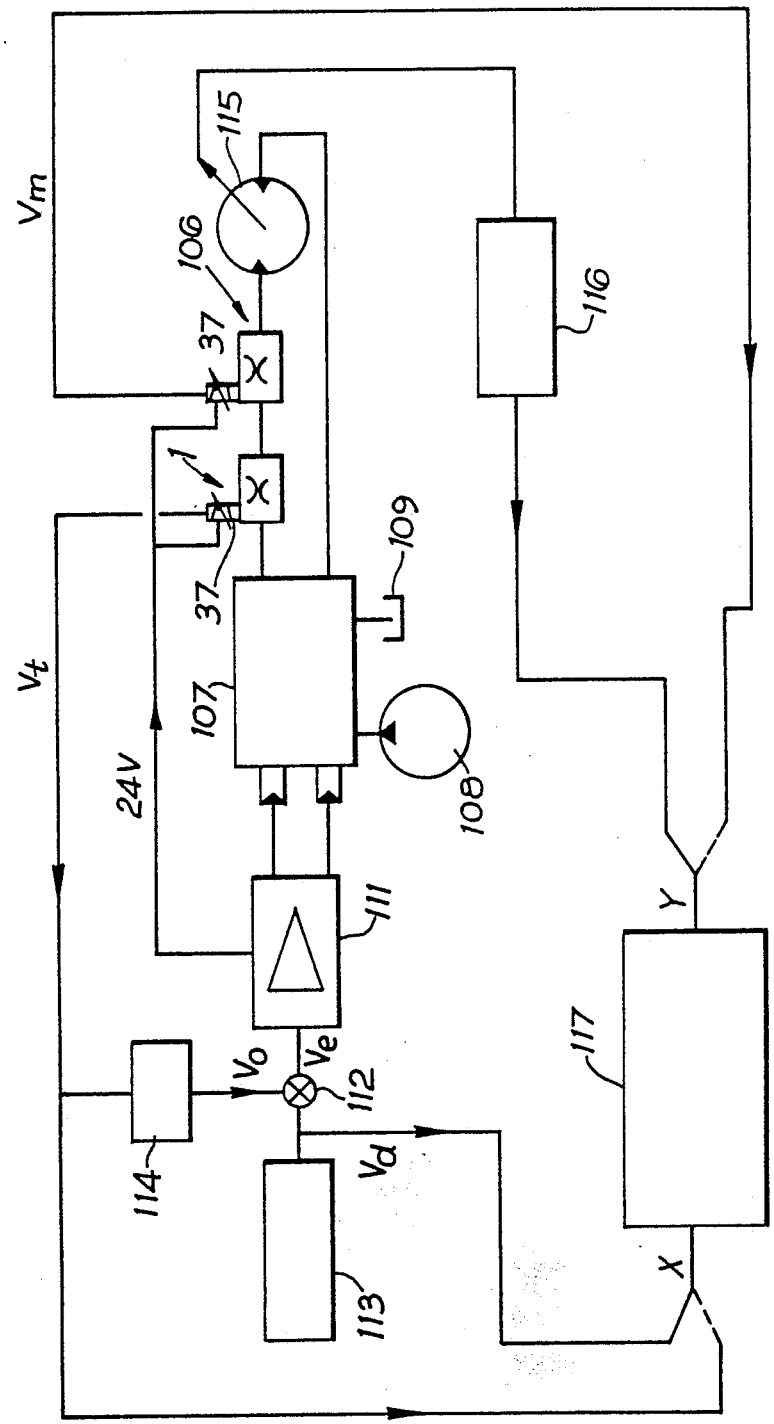
FIG. 15 is a circuit diagram of a calibration and test facility for the preferred arrangement of FIG. 14.

Turning now to FIG. 15, this shows a circuit diagram for calibrating and testing a flow sensor fitted with the variable orifice of FIG. 14. The flow sensor 1 under test is connected in series with a master unit 106 in the form of a flow sensor of similar type to that under test and which has been calibrated separately. A spool-type control valve 107 is connected to the flow sensor 1 under test and is supplied with hydraulic fluid from a pump 108, a tank connection 109 being provided. Flow of hydraulic fluid through the control valve 107 is controlled by an amplifier 111 which is responsive to an error voltage $V_e$ produced by a summation device 112 to which is applied a demand voltage $V_d$ from a demand potentiometer or signal generator 113, and a voltage $V_o$ derived from a voltage converter 114 to which is applied the output voltage $V_t$ from the sensor 1 under test, this output being obtained from the LVDT 37 of the sensor. The output from the master unit 106 is applied to one input of a meter motor 115, a second input of which is connected directly to the control valve 107. The electrical output signal of the meter motor 115 is connected to a tachometer 116 which produces an electrical output signal which is applied to the Y input of an X-Y recorder, U.V. (ultra violet) recorder or oscilloscope 17. When checking the master unit 106, the X input of the recorder 117 is connected to the demand voltage $V_d$ and the Y input to the tachometer output. When the sensor 1 under test is to be checked, the Y input of the recorder 117 is connected to the output of the LVDT 37 of the master unit 106, and the X input is connected to the output of the LVDT 37 of the sensor 1 under test.

The calibration procedure is as follows:

1. Set demand voltage $V_d$ to correspond with the required travel of the spool 8 of the flow sensor just within the overlap region thereof.

2. Record the output flow by monitoring the voltage output of the tachometer 116 or the voltage output $V_m$ from the master unit 106.

3. Adjust the variable orifice 95 of the sensor 1 under test to give the required flow (maximum flow at low range) or output voltage from the LVDT 37 such that the output voltage of the sensor 1 under test $V_t$ equals the output voltage $V_m$ from the master unit 106.

4. Lock the variable orifice 95 in the adjusted position (locking arrangement not shown in FIG. 14) and re-check the reading to ensure that the flow rate has not been altered on locking the variable orifice. The variable orifice 95 will normally be adjusted by turning the coarse valve member 96 with the needle valve 97 being maintained closed. However, when extremely fine adjustment is required, then the main valve member 96 will be closed and the needle valve adjusted so as to give the required flow through the needle valve. A further alternative is to use a continued setting of both the valves 96 and 97.

Figure 16:
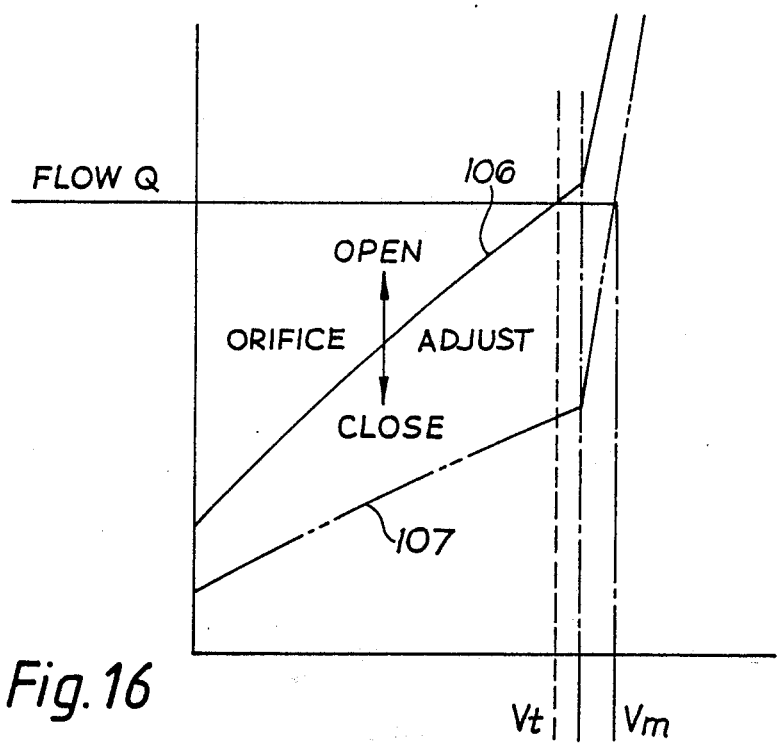
FIG. 16 is a graph useful in explaining the calibration an test facility of FIG. 15, and FIGS. 17, 18 and 19 are illustrations of application of the flow sensor in accordance with the invention.

FIG. 16 is a graph of flow rate Q against voltage and illustrates how the curves will vary according to whether the variable orifice 95 is opened or reduced. The full line curve 106 is that for the sensor 1 under test and the broken line curve 107 is that for the master unit.

The provision of a variable orifice 95 as opposed to the fixed orifice 18 shown in FIGS. 1, 3 and 11 is that a standard flow sensor can be provided with the variable orifice giving the required adjustment of the flow range of a given sensor for a specific application. The advantages of this arrangement are as follows:

1. Enhanced flexibility of the flow sensor.

2. Reduced scatter by applying the calibration procedure described in relation to FIGS. 15 and 16.

3. Flow characteristics of a given sensor can be re-set in the field if required.

4. Improved contamination resistance due to the use of an annular flow orifice provided by the variable orifice 95 as opposed to a circular aperture provided by the fixed orifice 18, which fixed orifice is more prone to becoming blocked by solid contaminants in the hydraulic fluid.

5. Standardisation of the flow sensor reduces the number of variable piece part.

6. The sharp-edge orifice of the variable orifice 95 ensures temperature independence of the flow characteristics of the sensor.

Figure 18:
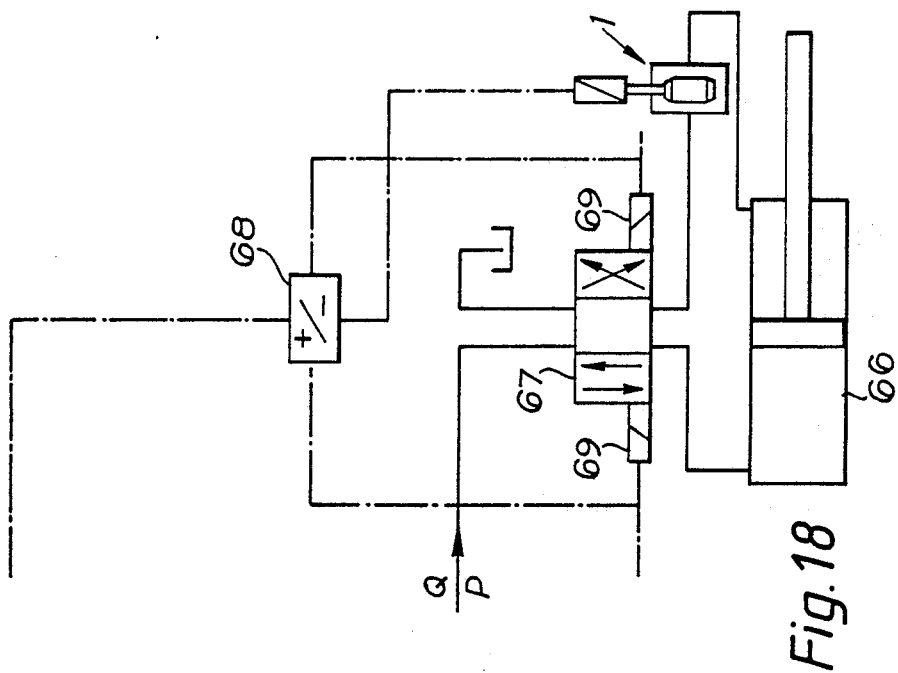
Figure 17:
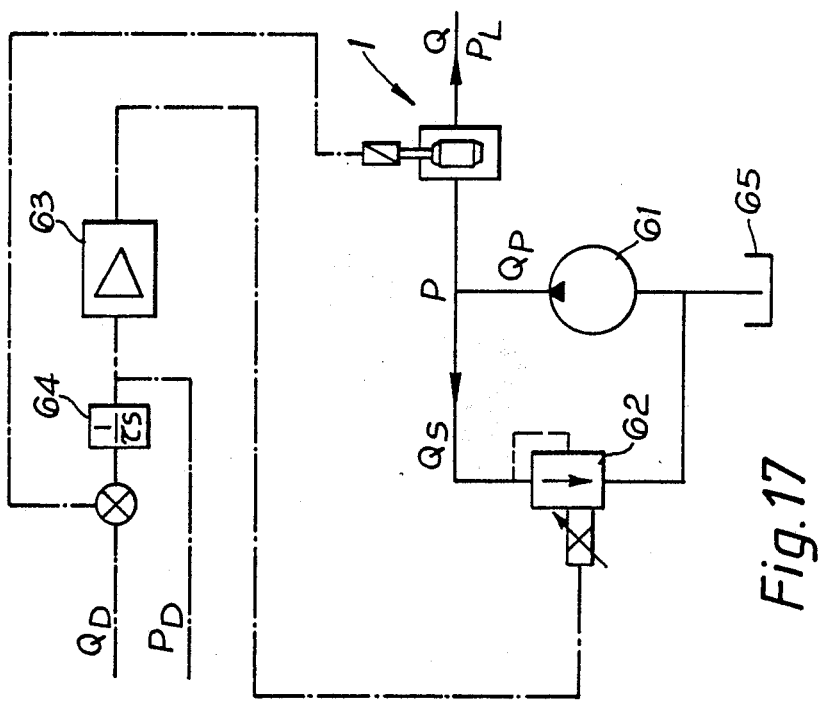
Figure 19:
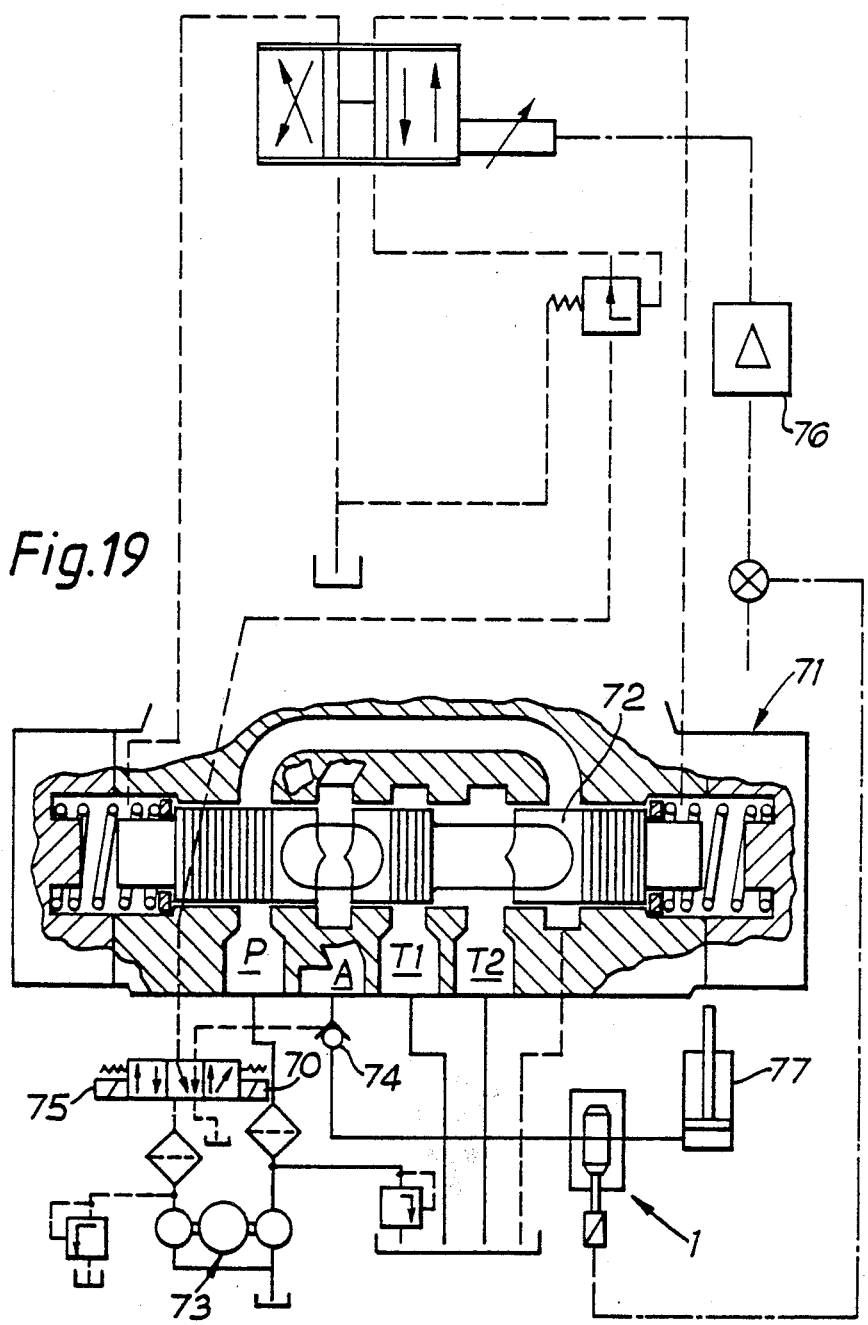

FIGS. 17, 18 and 19 show different applications of the flow sensor 1 in accordance with the invention which may be of the form, for example, of FIGS. 1, 3, 11 or 14 and which are shown in FIGS. 1 and 11 as elements in meter-in/meter-out systems. In FIGS. 17, 18 and 19, the flow sensor 1 is employed in bleed-off systems.

FIGS. 17 and 18 show pressure/flow (PQ) control systems comprising low cost components and the simplest form is that of FIG. 17 which comprises a fixed displacement pump 61, a proportional pressure control valve 62, a flow sensor 1 in accordance with the present invention, and a drive amplifier 63 which incorporates an integrator in the form of a resistor-capacitor network 64. The flow sensor 1 performs the dual function of providing a pressure flow relationship and acting as a flow feedback transducer. In the flow control mode, the pressure control valve 62 controls upstream pressure P and acts as a bleed-off valve by spilling off any surplus flow back to tank 65. It will be observed that the system is of a closed-loop configuration which ensures that the system is not sensitive to variations in pressure and temperature. Pressure control is achieved by limiting the input signal $P_D$ to the drive amplifier 63. The resistor-capacitor network 64 provides enhanced steady state and dynamic performance in the flow control mode.

Turning now to FIG. 18, this is an alternative system to that of FIG. 17 for systems using asymmetrical cylinders or actuators 66. The flow sensor 1, now acting as a bidirectional device, is connected between the annular side of the cylinder 66 and one of the service ports of a four-way directional control valve 67. To obtain negative feedback in both directions, a polarity change-over switch 68 has to be incorporated into the feedback signal circuit which is associated with the controlling solenoids 69 of the valve 67. The advantages of the arrangement of FIG. 6 are that the system has symmetrical signal flow characteristics and the flow rating of the flow sensor 1 is based on the annular cylinder area of the actuator 66.

Turning now to FIG. 19, this illustrates a system suitable for controlling single-acting cylinders or actuators and was originally developed for a specific lift or elevator control application. The system comprises a four-way proportional control valve 71 fitted with a special spool 72 and in this regard, reference is made to co-pending European patent application No. 82.304405.2. The system further comprises a fixed displacement pump 73, a piloted check valve 74 operated by a directional valve controlled by two solenoids 70 and 75, a flow sensor 1 in accordance with the present invention and a drive amplifier 76. The check and venting valves 74 and 75 are required to comply with the stringent safety regulations or requirements for lift or elevator control systems. The three distinct operating modes of the system of FIG. 7 are as follows:

1. Actuator stationary
2. Power up
3. Gravity down

In the stationary mode, the cylinder or actuator 77 being controlled is held by the spring-centred overlapped main spool 72 and check valve 74, both solenoids 70 and 75 being in the deenergised state thereby venting pilot supply and pilot check pressure to tank. The pump 73 is off loaded by connecting the pressure port P of the valve 71 to the tank port T2.

In the power-up mode, the spool 72 of the valve 71 is displaced to the left as seen in FIG. 19, thereby connecting the flow to the actuator 77 by throttling the pump bleed-off flow through the tank port T2. The solenoid 75 is energised, thereby activating pilot supply pressure whilst keeping pilot check pressure vented.

In the gravity-down mode, the spool 72 of the valve 71 is displaced to the right as seen in FIG. 19, thus off loading the pump 73 through the tank port T2 and controlling the velocity of the actuator 77 by throttling the flow from the service port A to the tank port T1. In this mode, the solenoids 70 and 7 are energised thus activating pilot supply pressure and pilot check pressure. The flow feedback loop of this system ensures highly repeatable velocity, acceleration and deceleration control in the two active operating modes.

It will be seen that the flow sensor of the present application is a simple but highly effective device capable of many applications, especially in hydraulic control systems. The flow sensor is relatively inexpensive to produce and if a given sensor requires to be operated with different performance characteristics, then it is necessary merely to replace the spool 8 by a spool of different configuration, keeping the main body of the sensor exactly the same, and/or changing the size of the fixed orifice 18. However, it will be appreciated that a change in the performance of a given sensor can be altered not only by shaping the ends of the spool 8 differently but also by electronic means. Whilst a straightforward regular taper of the ends of the spool 8 have been shown in the drawings, it will be appreciated that a more complex shaping of the ends of the spool 8 can be effected to bring about required flow characteristics.

The flow sensor is comparatively small compared with known flow sensors and can be inserted, for example, in a service line, whereby it can be used with existing control valves without having to modify the latter to accommodate the flow sensor.

Furthermore, in some applications, such as those illustrated in FIGS. 1, 11, 17, 18 and 19, advantage can be taken of using control components of lower performance characteristics because performance of the system is dependent primarily on the characteristics of the flow sensor 1.

We claim:

1. A flow sensor comprising a body formed with a cylindrical bore, at least one fluid inlet and one fluid outlet for permitting ingress and egress of fluid to and from the sensor, and a spool slidably mounted within the bore and tapered at either end past which fluid flows from the inlet to the outlet, wherein the spool also has a single spring mounted internally thereof and acting against and between two spaced abutments which are connected to the interior of the spool in such a way that they move with the spool in one direction of movement thereof and slide relative to the spool in the opposite direction of movement thereof, the spool being arranged to close the outlet in the null position of the spool when no fluid flow takes place, and being movable against the action of the single spring when fluid flow is present, to open the outlet, the extent of movement being representative of the rate of flow of the fluid and being sensed by sensor means associated with the spool to provide an output also representative of fluid flow.

2. A flow sensor according to claim 1, wherein the sensor is bidirectional with both ends of the spool being tapered and with the single spring means serving to urge the spool to the null position irrespective of the previous direction of movement thereof.

3. A flow sensor according to claim 1 or 2, wherein the single spring is in the form of a helical compression spring mounted between two abutments carried by a rod adjustably mounted at one end in the body and extending within the spool, the abutments being mounted on the rod such that this distance apart is held at a maximum but is decreased on movement of the spool.

4. A flow sensor according to claim 1, wherein the sensor means is of the type which produces an electrical output signal.

5. A flow sensor according to claim 4, wherein the sensor means is in the form of a linear variable differential transformer connected to the spool.

6. A flow sensor according to claim 5, wherein the sensor means is connected to the spool via a member attached to one end of the spool, the member being apertured for the through flow of fluid.

7. A flow sensor according to claim 5, wherein the sensor means is connected to the spool via a solid member which is formed integrally with, or sealed to, one end of the spool, and the spaced abutment means are apertured for the through flow of fluid.

8. A flow sensor according to claim 1, and it further comprising an orifice disposed in the body to provide a permanent bleed connection between the inlet and the outlet.

9. A flow sensor according to claim 8, wherein the orifice is a fixed orifice.

10. A flow sensor according to claim 8, wherein the orifice is a variable orifice.

11. A flow sensor according to claim 1 or 2, wherein the inlet and outlet are in the form of side drillings in the body of the sensor which connect with respective end chambers provided at the ends of the through bore of the body, the end chambers being connected via respective cut-away portions of the sensor body with respective blind bores in the form of end drillings in the sensor body extending generally parallel to the through bore, whereby the inlet can be connected to the outlet but with the end chambers remaining unconnected.

12. A flow sensor comprising a body formed with a through bore, at least one fluid inlet and one fluid outlet for permitting ingress and egress of fluid to and from the sensor, and a spool slidably mounted within the bore and having at least one shaped end past which fluid flows from the inlet to the outlet, wherein the spool also has resilient means mounted internally thereof and acting against and between two spaced abutments which are connected to the interior of the spool in such a way that they move with the spool in one direction of movement thereof and slide relative to the spool in the opposite direction of movement thereof, the spool being arranged to close the outlet in the null position of the spool when no fluid flow takes place, and being movable against the action of the resilient means when fluid flow is present, to open the outlet, the extent of movement being representative of the rate of flow of the fluid and being sensed by sensor means associated with the spool to provide an output also representative of fluid flow, an orifice disposed in the body to provide a permanent bleed connection between the inlet and the outlet, said orifice being variable, the variable orifice comprising an adjustable coarse orifice and an adjustable fine orifice which may be used either alone or in combination.

* * * * *